C. C. RANKIN.
NUT LOCK.
APPLICATION FILED NOV. 10, 1909.
971,637.
Patented Oct. 4, 1910.
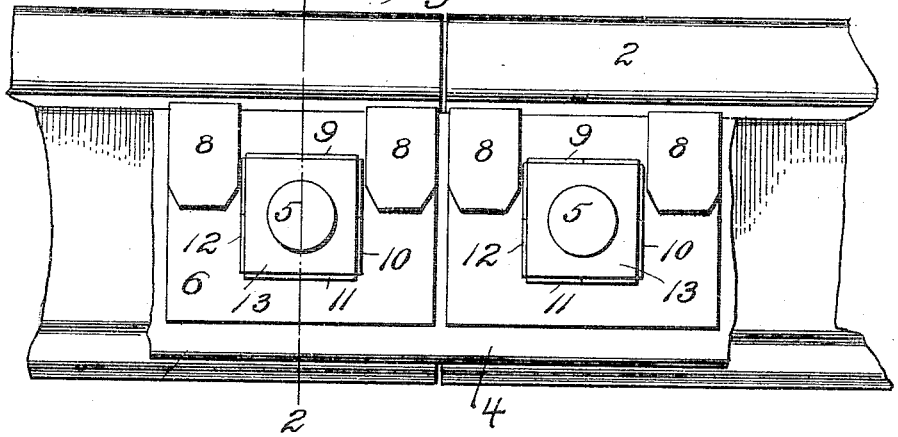
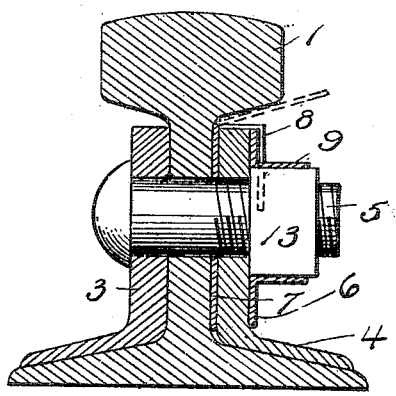
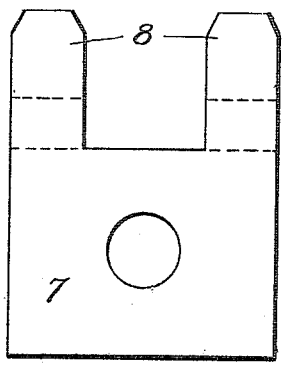
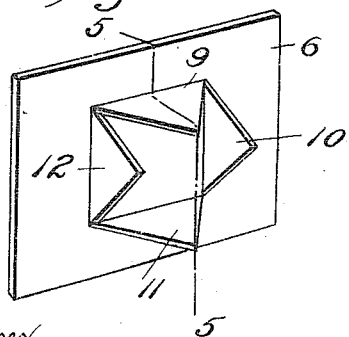
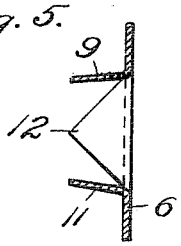
Witnesses
O. Strauss
Jos. A. Ryan
Inventor
Charles C. Rankin,
By Mason Fenwick & Lawrence
Attorneys

UNITED STATES PATENT OFFICE.

CHARLES CALHOUN RANKIN, OF LOUISVILLE, KENTUCKY.

NUT-LOCK.

971,637.  Specification of Letters Patent.  Patented Oct. 4, 1910.

Application filed November 10, 1909. Serial No. 527,251.

*To all whom it may concern:*

Be it known that I, CHARLES C. RANKIN, a citizen of the United States, residing at Louisville, in the county of Jefferson and State of Kentucky, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, and particularly to nut locks adapted for holding nuts in position in the joints of rails and structures of like character, and has for an object the provision of means for holding the nut against rotation, and locking means for said holding means.

Another object in view is the arrangement in a nut lock, of a plate formed with a plurality of pressed out members for engaging the sides of a nut, and a plate formed with bendable fingers designed to be bent over said plate for preventing any movement thereof, and for acting as auxiliary locking means to the nut.

A still further object in view is the arrangement in a nut lock, of a plate with means for engaging the nut, and a plate provided with fingers positioned behind the fish plate of a rail tie, and arranged so that the fingers may be bent over said first mentioned plate for locking the same in position.

With these and other objects in view the invention comprises certain novel constructions, combinations, and arrangement of parts as will be hereinafter more fully described and claimed.

In the accompanying drawings: Figure 1 is a side elevation of the ends of abutting rails, shown in connection with an embodiment of the invention. Fig. 2 is a section through Fig. 1, approximately on line 2—2 thereof. Fig. 3 is a detail perspective view of the plate formed with bendable fingers. Fig. 4 is a detail perspective view of the locking plate. Fig. 5 is a section through Fig. 4, approximately on line 5—5.

Referring to the accompanying drawings by numerals, 1 and 2 represent the abutting ends of rails, and 3 and 4 indicate fish plates of any ordinary or preferred kind. The rails 1 and 2 may be provided with any desired number of apertures for accommodating the securing bolts 5 and of necessity the fish plates will be provided with the same number of apertures. Also locking plate 6 and plate 7 formed with bendable fingers 8, are formed with apertures similar to the apertures formed in the fish plates, so as to register therewith. The locking plate 6 is provided at each aperture with pressed out fingers or extensions 9, 10, 11 and 12 for fitting on the four sides of nuts 13. All of the fingers or pressed out portions 9, 10, 11 and 12 are of substantially the same length and inclined toward each other as shown in Fig. 5 when the plate 6 is not in position. The plate 6 is preferably made of spring material, as for instance spring steel, so that when the plate is arranged in position, as shown in Figs. 1 and 2, the fingers 9, 10, 11 and 12 will yieldingly grip the nut for preventing vibration thereof. The fingers 9, 10, 11 and 12 also act as a lock for preventing the rotation of the nuts 13 and in order to prevent the locking plate 6 from accidental removal plate 7 is provided with fingers 8 which act as a retaining means for plate 6, and also as auxiliary locking means for nuts 13. The fingers 8 are made of such length and breadth as to touch or almost touch the fingers or projections 9, 10, 11 and 12 when the fingers are bent down into the position shown in Fig. 1.

In assembling the nut lock the plate 7 is placed back of the fish plate 4, that is between fish plate 4 and rail 1, and is clamped in position by nuts 13. Locking plate 6 is then placed in position so that the respective fingers 9, 10, 11 and 12 will engage the respective nuts 13. After plate 6 has been thus placed in position fingers 8 are bent down to the position shown in Figs. 1 and 2, which will positively prevent the accidental removal of plate 6, and thus firmly lock the respective nuts against removal.

What I claim is:

1. In a nut lock for a rail joint, a locking plate for holding a nut in position, projecting members carried by such plate and arranged to engage the sides of the nut, an auxiliary locking plate arranged to be placed between one of the fish plates of the rail joint and the end of one of the rails, and fingers formed on the plate last mentioned and bent over against the projecting members of the first plate for holding such members against the sides of the nut.

2. In a nut lock for a rail joint, a locking plate for holding the nut in position, resilient fingers pressed from said plate and engaging the sides of said nut, an auxiliary locking plate arranged to be placed between one of the fish plates and the end of one of the rails, and fingers projecting from said auxiliary locking plate and bent over against the first mentioned locking plate in proximity to said resilient fingers for acting as retaining means for the first mentioned locking plate and as auxiliary locking members for the nut.

In testimony whereof I affix my signature in presence of two witnesses.

CHARLES CALHOUN RANKIN.

Witnesses:
JOHN HAGERTY,
CHAS. BRAUNDEL.